April 8, 1930.  J. C. CROMWELL  1,753,263
WELDING APPARATUS AND METHOD OF WELDING
Filed March 18, 1927   3 Sheets-Sheet 1
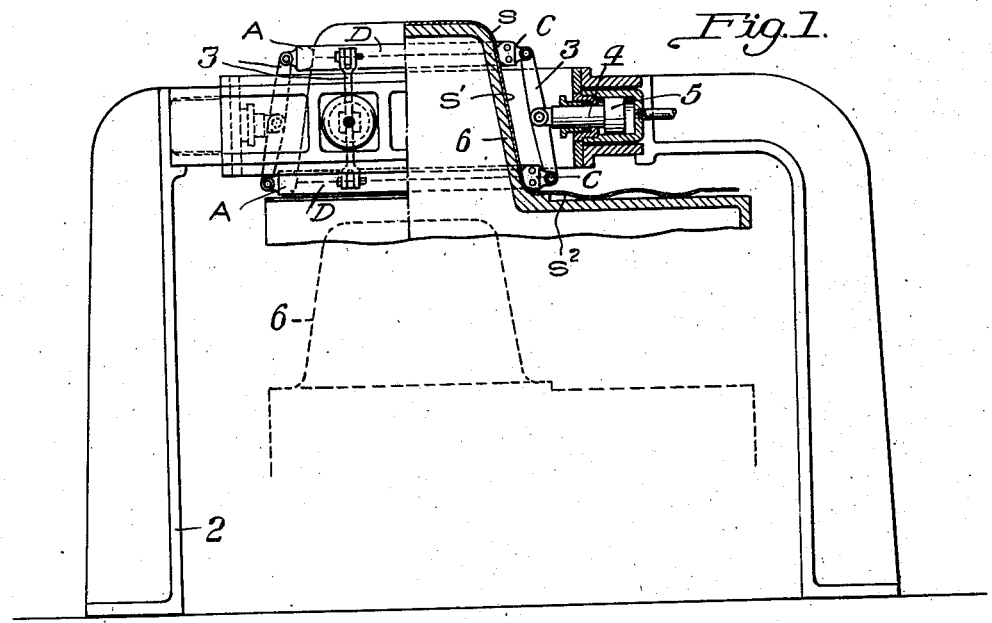
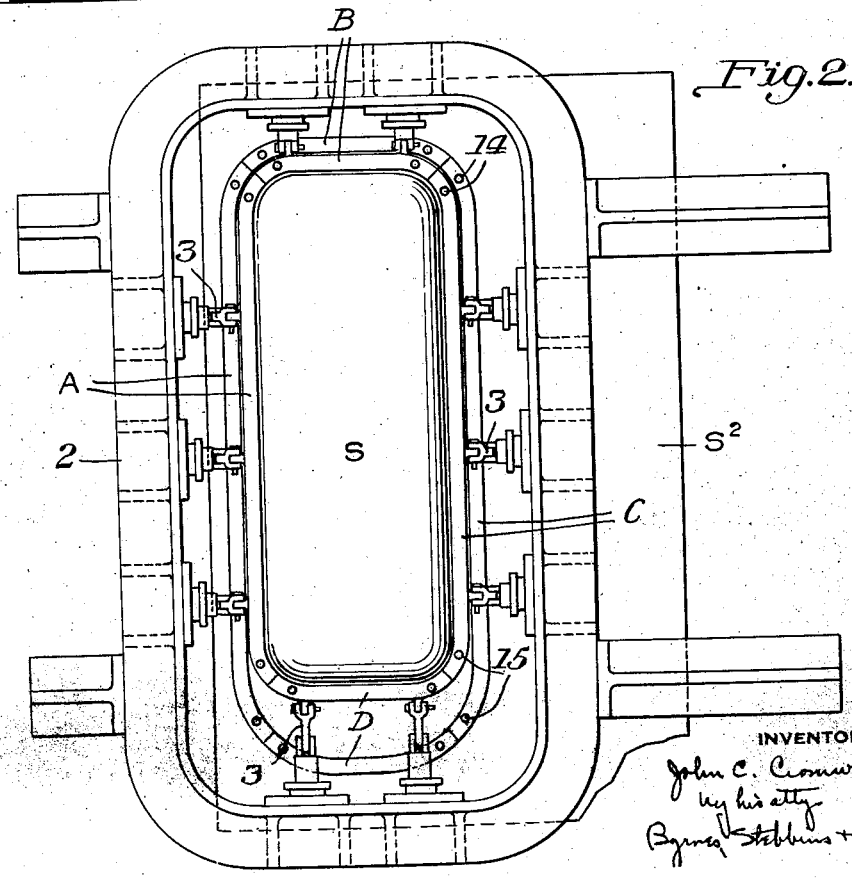
INVENTOR
John C. Cromwell
by his atty
Byrnes, Stebbins & Parmelee

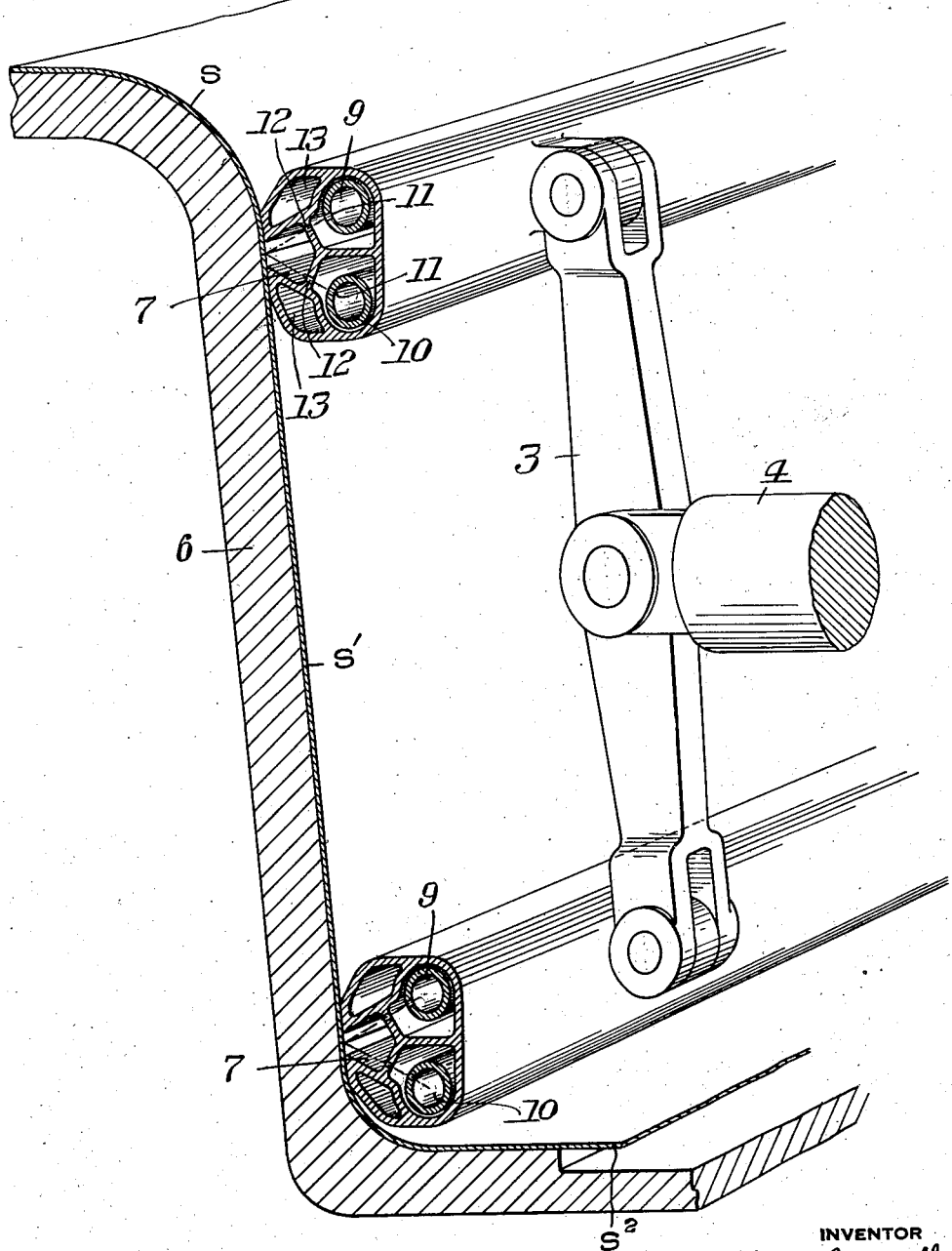

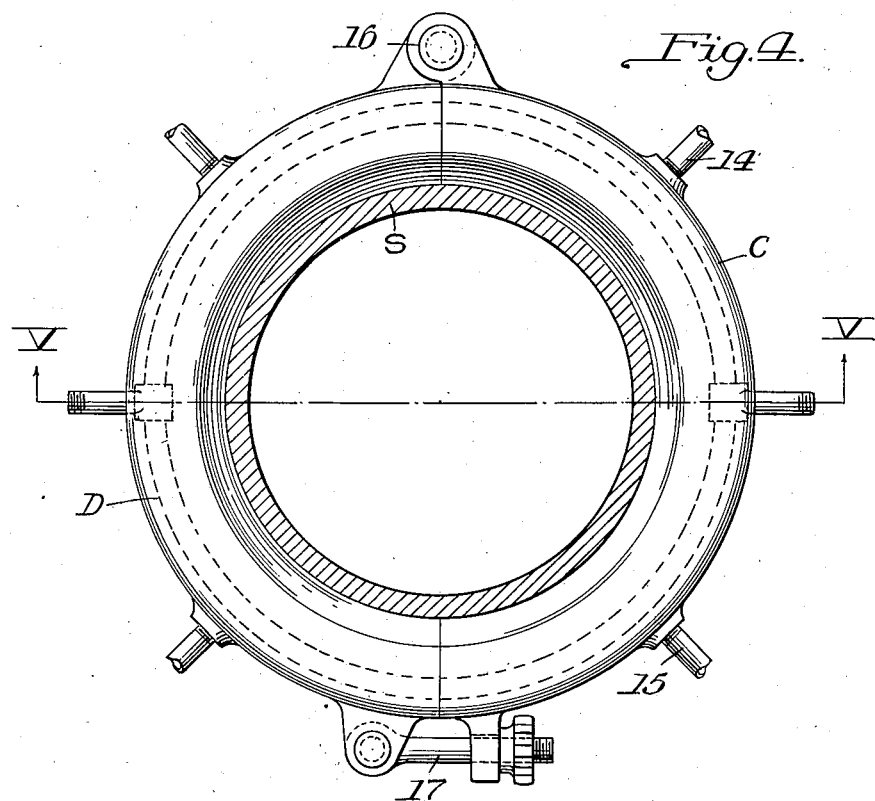
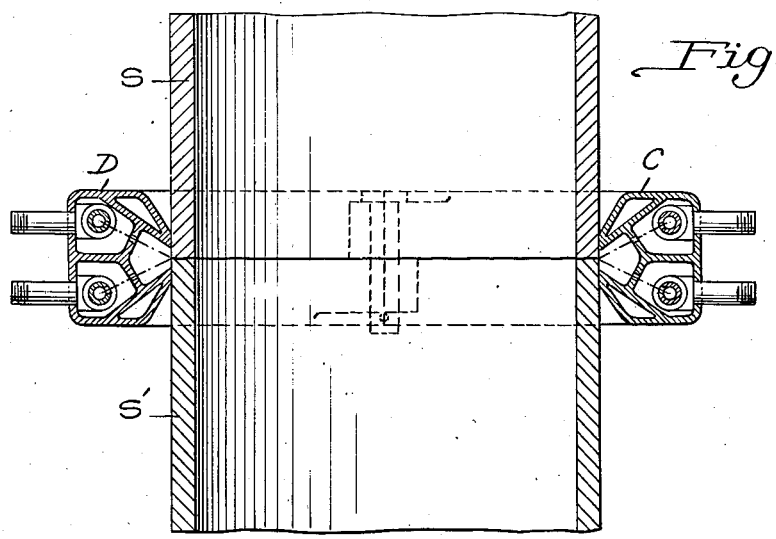

Patented Apr. 8, 1930

1,753,263

UNITED STATES PATENT OFFICE

JOHN C. CROMWELL, OF COLUMBUS, OHIO, ASSIGNOR TO THE STEEL SANITARY COMPANY, OF ALLIANCE, OHIO, A CORPORATION OF OHIO

WELDING APPARATUS AND METHOD OF WELDING

Application filed March 18, 1927. Serial No. 176,568.

The present invention relates broadly to the art of metal working, and more particularly to an improved method and apparatus by means of which sections of metal may be effectively joined by fusing.

It is customary, at the present time, in the art to which the present invention relates, to effect the joining of metal sections or bodies by a welding operation resulting in the formation of a joint either with or without a filling material. In all cases with which I am familiar, however, such welding operations are obtained by a localized treatment zone which is progressively moved along the line of proposed weld to either produce, in this manner, a continuously welded joint or a joint having spaced welded portions.

Apparatus for this purpose has heretofore comprised welding tips having either one or more orifices therein, which orifices in every instance have been of a general circular contour, providing a point flame effective for welding a limited or localized area only. In carrying out such a welding operation, considerable difficulty has been experienced due to deformation of the metal being welded by reason of the different temperature conditions in different portions thereof, and particularly in different portions adjacent the proposed line of weld. While it is possible, with efficient apparatus, to effect a welding operation even where the surfaces to be welded are spaced a certain distance, the deformation referred to due, for example, to a localized heating to approximately 3,000 degrees in one portion while the remainder of the metal is at substantially room temperature, results in extremely undesirable and irregular welding. In many cases it is necessary to actually effect a reshaping of the parts to overcome the objectionable conditions referred to and enable the desired joint to be produced.

The present invention has for one of its objects the overcoming of the objectionable localized and progressive heating and welding operations, and the substitution therefor of an operation embodying the use of a welding flame elongated continuously in the direction of weld. Such a flame may be prorection of weld. Such a flame may be produced, for example, by the provision of a slot in the welding apparatus, as distinguished from the openings heretofore utilized.

Another object of the present invention is to provide a method and apparatus effective instantaneously throughout a substantial length of a metal object for effecting uniform conditions of temperature throughout that entire length, whereby an elongated weld is instantaneously produced under such conditions that the characteristics thereof are uniform, as distinguished from the non-uniform characteristics which have heretofore necessarily been present.

Still another object of the present invention is to provide an improved apparatus embodying a welding section or sections having means for the effective distribution of gas throughout the length thereof in combination with means for holding the sections in cooperative relation to the articles to be welded, whereby conditions of the character referred to are obtained.

In the accompanying drawings I have shown, more or less diagrammatically, and for purposes of illustration only, certain preferred embodiments of the present invention, it being apparent to those skilled in the art that these drawings do not define the limits of my invention, as changes in the construction, arrangement, and the manner of use thereof, may be made without departing from the spirit of the present invention or the scope of my broader claims.

In the drawings,—

Figure 1 is a view, partially in vertical section and partially in elevation, showing one form of welding apparatus embodying the present invention and adaptable, particularly, for the welding of sections adapted to form a receptacle, such as a tub or sink;

Figure 2 is a top plan view of the apparatus illustrated in Figure 1;

Figure 3 is a perspective view, partially in section, illustrating a portion of one of the welding sections utilized in accordance with the present invention;

Figure 4 is a vertical sectional view, similar to Figure 1, illustrating a slightly modified embodiment of the present invention; and

Figure 5 is a transverse sectional view on the line V—V of Figure 4.

Referring more particularly to Figures 1, 2 and 3 of the accompanying drawings, there is illustrated a suitable supporting framework 2 having carried thereby a plurality of welding sections A, B and C. Each of these sections is preferably mounted by a suitable pivotal connection on one end of an equalizing lever 3, which lever may be pivotally connected at an intermediate portion thereof to a piston rod 4 co-operating with a suitable piston 5 whereby these sections may be bodily moved toward or away from the article to be welded.

In Figure 1 there is illustrated a construction adapted to simultaneously form a plurality of spaced welds, and for this purpose there are provided duplicate welding sections in vertically spaced relation, the corresponding sections in each case being similarly mounted on opposite ends of the equalizing lever or levers. These sections as illustrated in Figure 1, when moved inwardly, are adapted to cooperate with metal sections S, S' and S² carried by a mandrel 6. The section S comprises a body of metal so shaped that it is adapted to form the bottom of a receptacle, such, for example, as a tub or sink; the section S' is shaped to form the general body of the receptacle; and the section S² is constructed to form the projecting flange and apron of the finished article, as will be apparent to those skilled in the art.

Each of the welding sections comprises an elongated body as illustrated in Figure 3, provided with a central chamber 7 having a discharge opening therefrom in the form of a continuous slot. This slot is of sufficient width so that with the welding sections in operative position the sides of the slot will lie on opposite sides of the proposed line of weld and confine the same.

For supplying the desired gases to the chamber 7, each section may be provided with a continuously extending conduit 9 and a similar conduit 10. Where an oxy-acetylene flame is desired, for example, one of the conduits 9 will be supplied with the oxygen, while the conduit 10 is supplied with the acetylene gas. These conduits may have formed at suitable points throughout their length a series of openings 11 adapted to permit a uniform and regulated discharge of gas therefrom, which gas passes through the openings 12 into the chamber 7, the general line of flow of the respective gases, whereby they are brought into impinging relationship substantially at the point of weld, being indicated in chain lines in Figure 3.

In order to prevent burning out of the welding sections, they may each be formed with suitable channels 13 adapted to have water circulated therethrough, the channels having suitable inlet and outlet connections 14 and 15, respectively, communicating therewith.

In actual operation of the apparatus described, the mandrel 6 having the sections S, S' and S² thereon, will be moved into the dotted line position illustrated in Figure 1, and thence upwardly into the full line position. In this position, the joints between the respective sections will lie in substantially the horizontal plane defined by the slots of the welding sections, whereby when the welding sections are moved inwardly by the action of the pistons 5, the desired relationship between the sections and proposed lines of weld will be automatically established. Due to the construction of the welding sections, there will be provided a slot, continuous or substantially continuous, throughout the entire perimeter of the article, or, in other words, throughout substantially the entire length of the proposed line of weld. With the parts in this position, the gas will be turned on as required, and almost instantaneously the entire weld will be completed under the action of the welding flame issuing from the slots in the sections. This slot arrangement insures a flame elongated continuously or substantially continuously in the direction of weld, whereby localized heating of progressive portions of the metal is obviated and substantially the entire body of metal on opposite sides of the proposed line of weld is brought to a welding temperature simultaneously. Under such conditions, the desired fusion of the metal is accomplished and the weld produced before an opportunity is given to the body of metal to become displaced or distorted such as inevitably results where localized or progressive heating is used.

From an inspection of Figure 1, it will also be apparent that the present invention lends itself to the production of welded joints on surfaces projecting in a substantially vertical direction. With the localized and progressive welding conditions heretofore used, such an operation has been considered impossible by reason of the flowing of the metal away from the joint. In accordance with the present invention, the uniform heating instantaneously throughout an elongated zone brings an entire body of metal to the welding temperature instantaneously and effects the desired weld before any objectionable flowing of the metal away from the line of weld, due to gravity, results.

In Figures 4 and 5 there is illustrated a slightly modified embodiment of the invention for the purpose of making more readily apparent the flexibility and range of use thereof. At the present time, it is customary in plumbing installations, both in connection with so-called soil pipes and water pipes, to provide joints of the bell and spigot type. Each of these joints requires considerable time, with no positive assurance that an absolutely tight joint will result. In accordance with the present invention, there may be provided a pipe welder which may be utilized in connection with plain pipe sections, the ends of which have been brought into abutting or substantially abutting relationship. This precludes the necessity of specially formed pipe sections, and enables sections to be cut on the job to the desired length and butted and welded at will.

In Figure 4 there is illustrated a pipe section $s$ and an abutting pipe section $s'$. Cooperating with these sections is a welder comprising a curved welding section $c$ and a similar section $d$. These sections may have a suitable pivotal connection 16, and may be held in the desired position about the pipe sections in any desired manner, as, for example, by the use of a swinging clamping bolt 17. With the exception of the fact that the sections $c$ and $d$ are curved to conform to the contour of the pipe or other article being welded, they are preferably substantially of the construction of the welding sections previously described. This provides a portable welder which may be quickly clamped in position about abutting pipe sections, whereby such sections may be welded by the use of a welding flame continuously elongated in the direction of the weld, as before referred to.

While I have herein illustrated the invention as applied to receptacles, such as tubs or sinks, as well as to pipes, it will be apparent that the utility of the invention is not restricted with respect to its manner of use, the elongated flame principle made possible by reason of the weld being equally applicable to the welding of sheets, plates, or other objects wherein an elongated weld is desired.

Certain advantages of the present invention arise from the provision of a welding section or sections having an elongated welding slot formed therein.

Other advantages of the present invention arise from the provision of a welding section or sections adapted to produce a welding flame continuously elongated in the direction of the line of weld in combination with means for effecting the desired distribution and delivery of gas for welding purposes.

Still another advantage of the present invention arises from the provision of elongated welding sections adapted to be bodily moved toward or from the metal to be welded, and operative for producing simultaneously throughout the length thereof a uniformly welded joint.

Still further advantages of the invention arise from the improved method of welding, herein as disclosed, embodying the use of a slot and elongated flame as distinguished from circular or multiple orifices with their consequent progressive and localized heating action.

Still further advantages of the present invention arise from the improved method of welding herein disclosed, by means of which the strains incidental to welding, together with the distortion of the metal being welded, are obviated.

A still further advantage of the invention arises from the employment of a method and apparatus by means of which it is possible to effect a welding operation with the parts to be welded disposed in a vertical or substantially vertical plane.

I claim:

1. In a welding apparatus, a plurality of relatively movable welding sections, each having a continuously extending welding slot formed therein, and means for maintaining said sections in cooperative relationship to the article to be welded, with the sections in abutting end to end relationship to provide a continuous substantially uniform welding zone throughout the entire length thereof.

2. In a welding apparatus, an elongated welding section having a continuously extending slot in one face thereof for the emission of a welding flame, the sides of said slot being shaped to cooperate with and clamp the adjacent members to be welded.

3. In the method of welding surfaces to form an endless weld line, the steps comprising bringing into adjacent relationship the surfaces to be welded, subjecting such surfaces to a welding flame continuously elongated throughout its length in the direction of welding, and maintaining the surfaces and flame relatively stationary during the welding operation.

4. In the method of welding surfaces to form an endless weld line, the steps comprising preshaping the surfaces to be welded, bringing the same into adjacent relationship, subjecting the adjoining surfaces to a welding flame continuously elongated throughout its length in the direction of weld, and maintaining the surfaces and flame relatively stationary during the welding operation.

5. In a welding apparatus, a plurality of welding sections adapted to clamp the parts to be welded, means for pressing said sections against said parts, and means for equalizing the pressure on the sections.

6. In an apparatus for welding, a plurality of seams, a plurality of welding sections adapted to clamp the parts to be welded, means for pressing said sections against said parts, and means for equalizing the pressure on the sections.

7. In an apparatus for welding a plurality of seams, a plurality of welding sections adapted to clamp the parts to be welded, connecting means for said sections, and means for exerting and equalizing the pressure on said sections.

8. A welding apparatus comprising an elongated casing provided with an elongated oxygen chamber and an elongated acetylene chamber adapted to maintain the gases separate from each other, and an elongated combustion chamber in direct communication with the oxygen chamber and the acetylene chamber, the arrangement of chambers being such that the oxygen and acetylene are maintained separate from each other up to the point where they are ignited in the combustion chamber.

In testimony whereof I have hereunto set my hand.

JOHN C. CROMWELL.